United States Patent
Cherubini et al.

(10) Patent No.: US 9,564,168 B2
(45) Date of Patent: Feb. 7, 2017

(54) ADJUSTABLE INTERPOLATION SAMPLING INTERVAL FOR TAPE SYSTEMS

(71) Applicant: International Business Machines Corporation, Armonk, NY (US)

(72) Inventors: Giovanni Cherubini, Rueschlikon (CH); Simeon Furrer, Altdorf (CH); Robert A. Hutchins, Tucson, AZ (US); Jens Jelitto, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/681,002

(22) Filed: Apr. 7, 2015

(65) Prior Publication Data
US 2016/0300593 A1 Oct. 13, 2016

(51) Int. Cl.
G11B 20/10 (2006.01)
G11B 5/584 (2006.01)
G11B 5/596 (2006.01)
G11B 20/18 (2006.01)

(52) U.S. Cl.
CPC ........ *G11B 20/10231* (2013.01); *G11B 5/584* (2013.01); *G11B 5/59688* (2013.01); *G11B 20/10388* (2013.01); *G11B 5/59666* (2013.01); *G11B 20/18* (2013.01)

(58) Field of Classification Search
CPC . G11B 5/59688; G11B 5/00821; G11B 5/584; G11B 20/1201; G11B 20/1484; G11B 2220/913; G11B 5/59644; G11B 20/10009; G11B 20/10231; G11B 20/10388; G11B 20/18
USPC .................................. 360/51, 31, 48, 76, 53
See application file for complete search history.

(56) References Cited

U.S. PATENT DOCUMENTS

| | | | |
|---|---|---|---|
| 5,210,660 | A | 5/1993 | Hetzler |
| 6,226,441 | B1 | 5/2001 | Hartung et al. |
| 6,785,632 | B1 | 8/2004 | Goker |
| 7,245,450 | B1 | 7/2007 | Cherubini et al. |
| 7,365,929 | B2 | 4/2008 | Cherubini et al. |
| 7,480,114 | B2 | 1/2009 | Cherubini et al. |
| 7,742,254 | B2 | 6/2010 | Cherubini et al. |
| 7,903,360 | B2 | 3/2011 | Cherubini et al. |
| 8,422,162 | B2 | 4/2013 | Cherubini et al. |

(Continued)

OTHER PUBLICATIONS

Cherubini et al., "High-Performance Servo Channel for Nanometer Head Positioning in Tape Systems," IEEE, IEEE/ASME International Conference on Advanced Intelligent Mechatronics, Jul. 2012, pp. 788-795.

*Primary Examiner* — Ali Neyzari
(74) *Attorney, Agent, or Firm* — Zilka-Kotab, PC

(57) ABSTRACT

In one general embodiment, a method includes determining a sampling interval for an interpolator using at least one of: predefined data stored in memory, and a standard deviation of a position error signal. The method further includes applying the sampling interval to the interpolator in response to determining the sampling interval. In another general embodiment, an apparatus includes an interpolator and a controller. The controller is configured to determine a sampling interval for the interpolator using at least one of: predefined data stored in memory, and a standard deviation of a position error signal. The controller is also configured to apply the sampling interval to the interpolator in response to determining the sampling interval.

20 Claims, 12 Drawing Sheets

(56) References Cited

U.S. PATENT DOCUMENTS

| | | |
|---|---|---|
| 8,422,163 B2 | 4/2013 | Cherubini et al. |
| 8,462,455 B2 * | 6/2013 | Aravind ............ G11B 5/59688 360/48 |
| 8,804,257 B2 | 8/2014 | Inch et al. |
| 2006/0285240 A1 | 12/2006 | Jurneke |

* cited by examiner

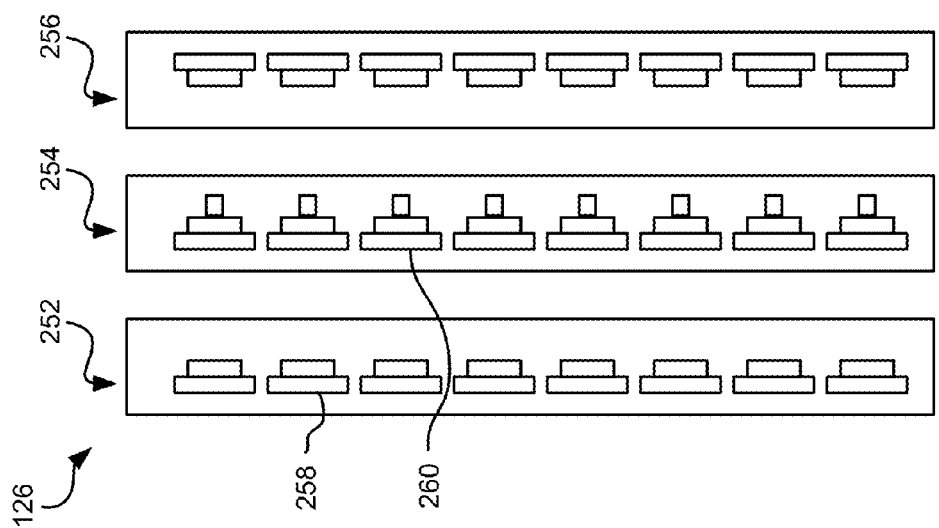
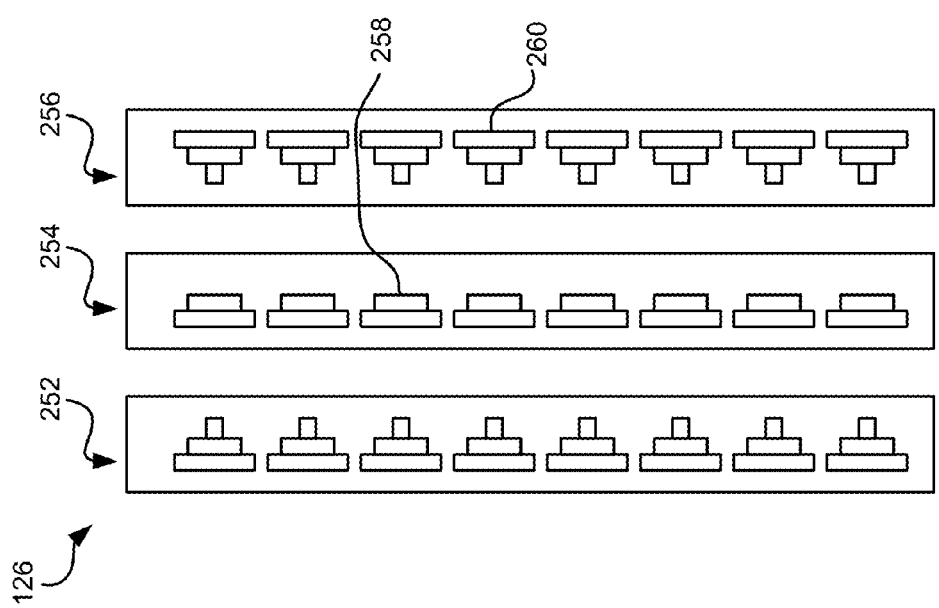

ADJUSTABLE INTERPOLATION SAMPLING INTERVAL FOR TAPE SYSTEMS

BACKGROUND

The present invention relates to data storage systems, and more particularly, this invention relates to the implementation of adjustable interpolation sampling intervals and/or correlator coefficients for tape systems.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

Moreover, timing-based servo (TBS) systems include servo patterns written to the recording media. The servo patterns include magnetic transitions having a chevron pattern which implements two different azimuthal slopes. Head position is derived from the relative timing of pulses, or dibits, generated by a narrow head reading the servo patterns.

However, the adoption of different tape media over time has led to problems concerning optimum detection of the servo patterns in conventional products. Different tape media implement varied characteristics which have led to the problems concerning efficient detection of the servo patterns. The different characteristics between the various tape media are not limited to signal-to-noise ratio (SNR) performance, but include also other important servo signal characteristics.

BRIEF SUMMARY

A method according to one embodiment includes determining a sampling interval for an interpolator using at least one of: predefined data stored in memory, and a standard deviation of a position error signal. The method further includes applying the sampling interval to the interpolator in response to determining the sampling interval.

An apparatus according to one embodiment includes an interpolator and a controller. The controller is configured to determine a sampling interval for the interpolator using at least one of: predefined data stored in memory, and a standard deviation of a position error signal. The controller is also configured to apply the sampling interval to the interpolator in response to determining the sampling interval.

A computer program product includes a computer readable storage medium having program instructions embodied therewith, the program instructions readable and/or executable by a controller to cause the controller to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Various embodiments disclosed herein include the implementation of adjustable interpolation sampling intervals and/or correlator coefficients for magnetic media systems.

In one general embodiment, a method includes determining a sampling interval for an interpolator using at least one of: predefined data stored in memory, and a standard deviation of a position error signal. The method further includes applying the sampling interval to the interpolator in response to determining the sampling interval.

In another general embodiment, an apparatus includes an interpolator and a controller. The controller is configured to determine a sampling interval for the interpolator using at least one of: predefined data stored in memory, and a standard deviation of a position error signal. The controller is also configured to apply the sampling interval to the interpolator in response to determining the sampling interval.

In yet another general embodiment, a computer program product includes a computer readable storage medium having program instructions embodied therewith, the program instructions readable and/or executable by a controller to cause the controller to perform the foregoing method.

Figure 1A:
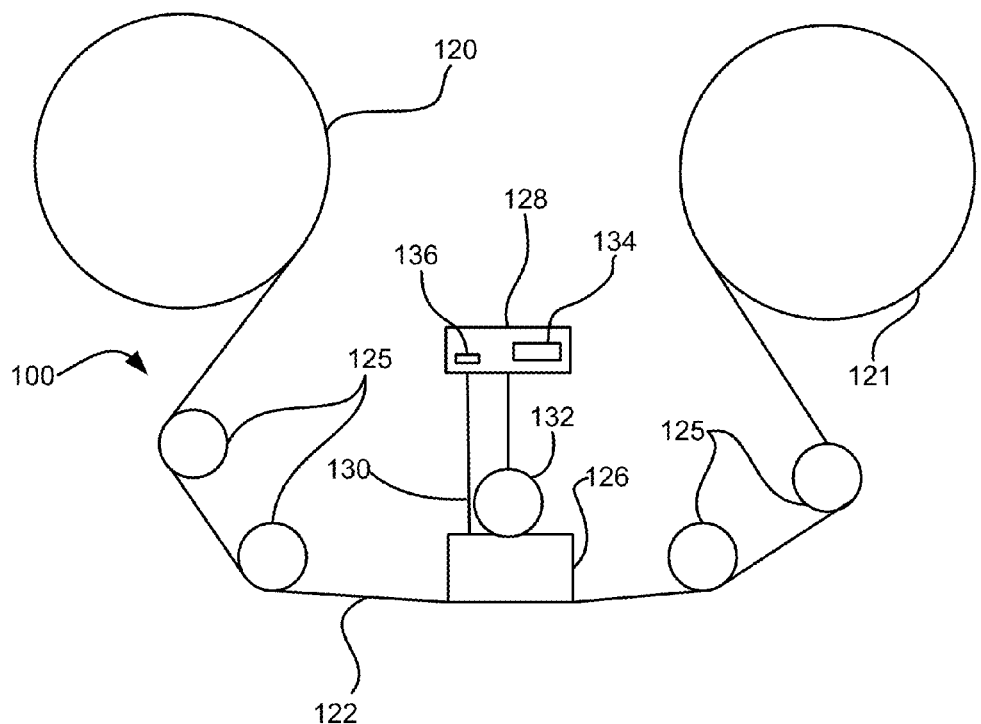
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
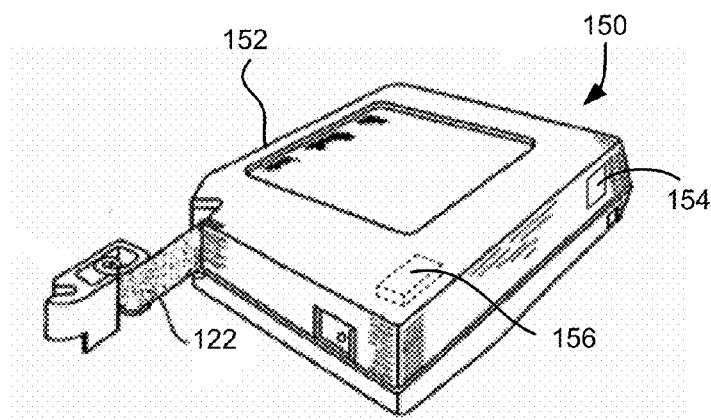
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
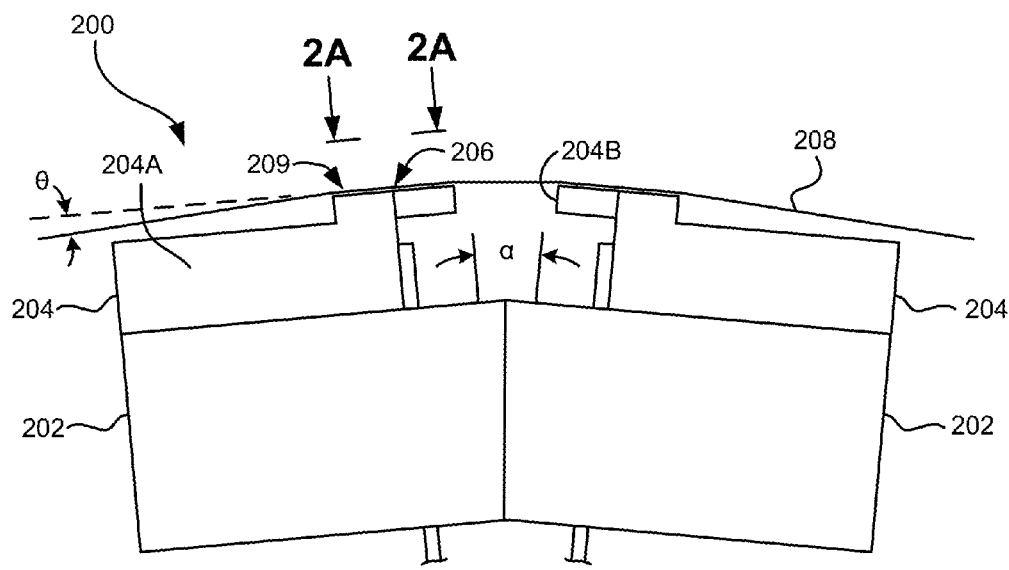
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B are made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
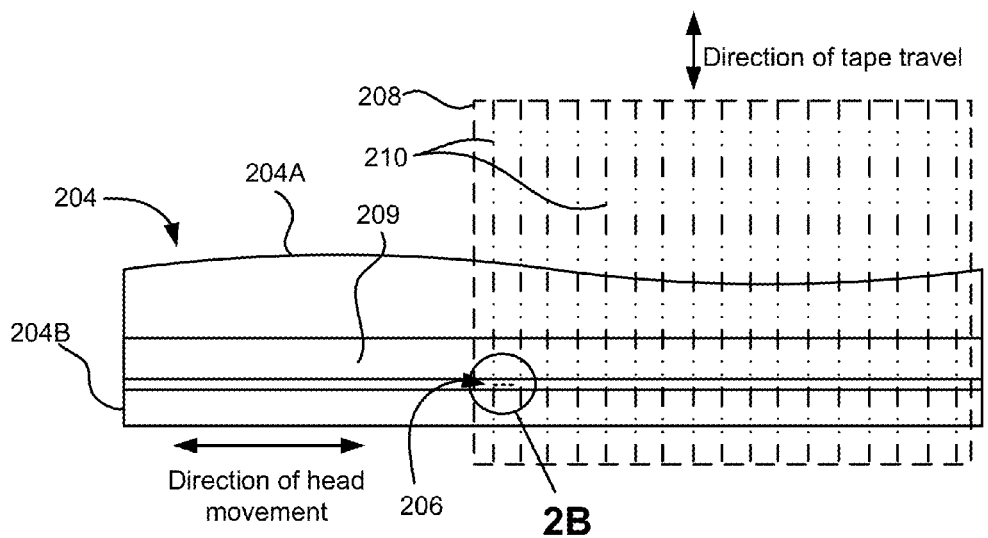
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
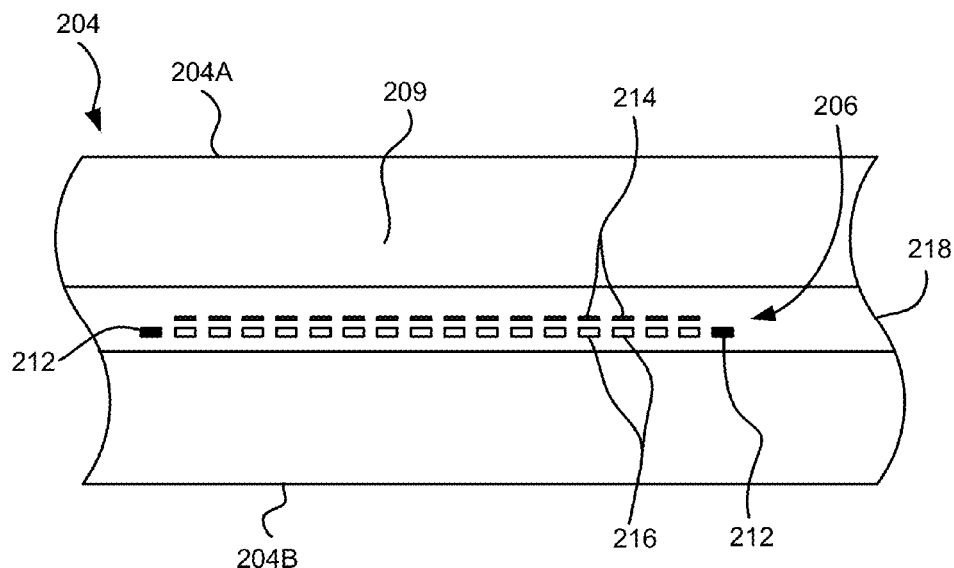
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
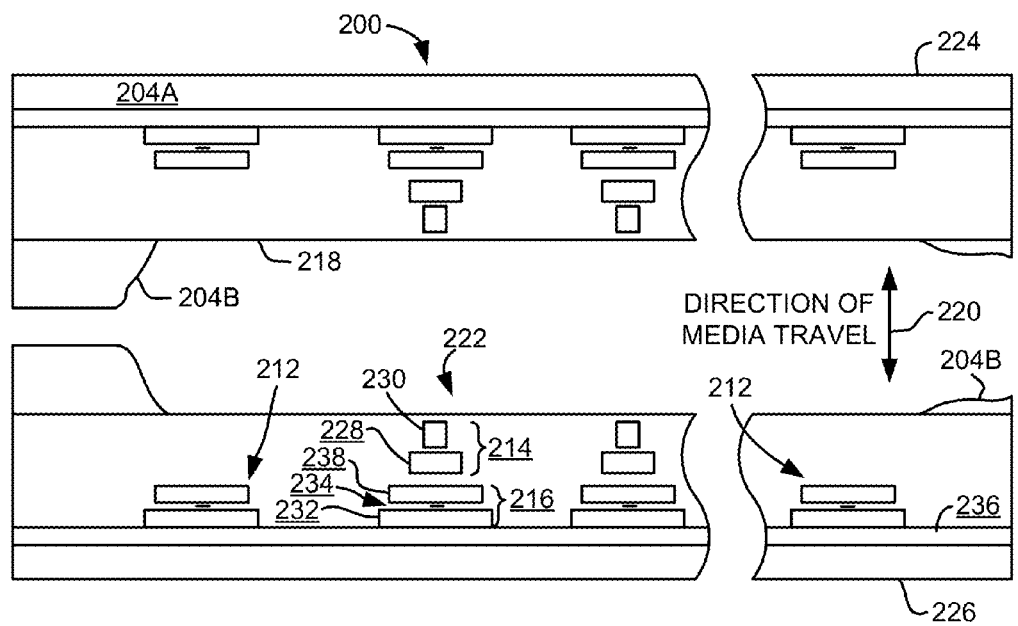
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
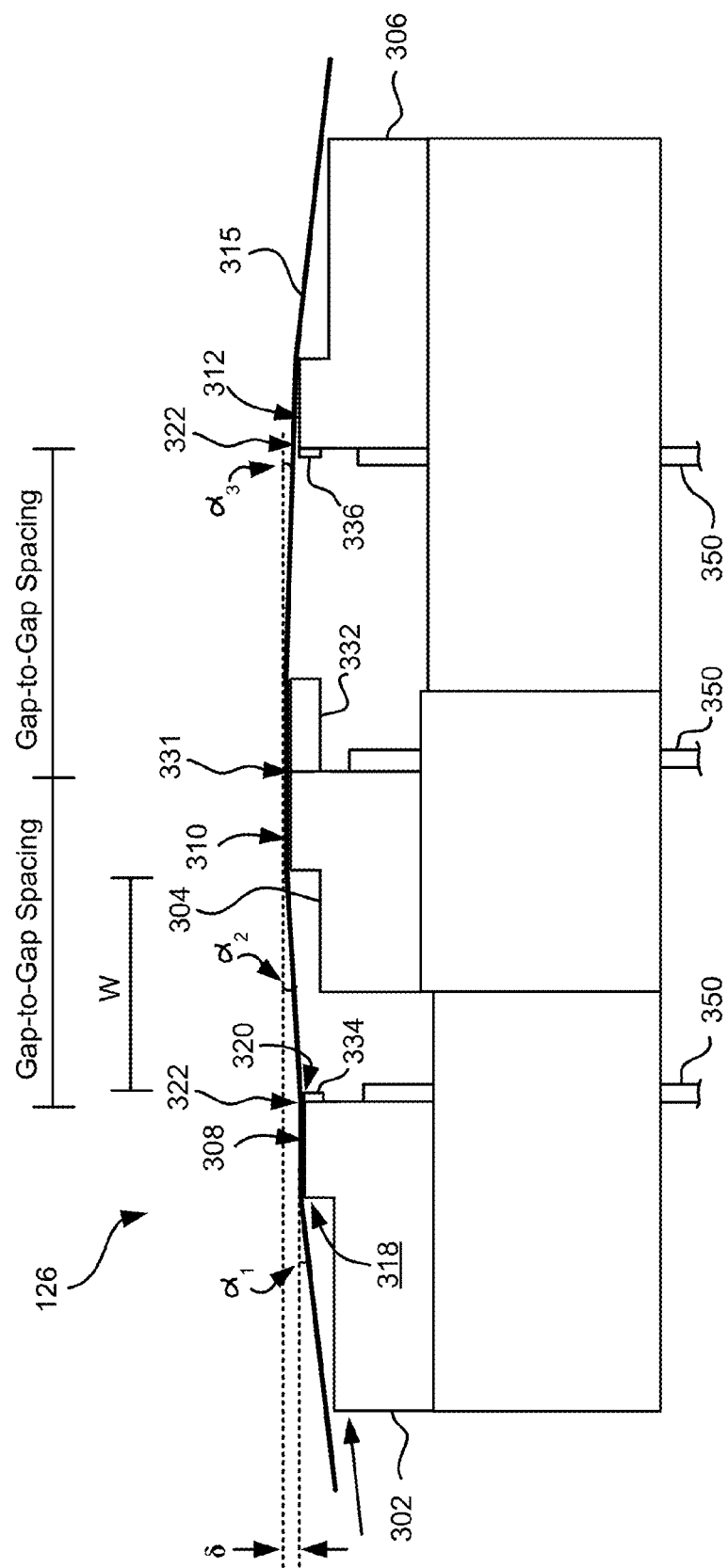
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

In one embodiment, the tape bearing surfaces 308, 310, 312 of the first, second and third modules 302, 304, 306 lie on about parallel planes (which is meant to include parallel and nearly parallel planes, e.g., between parallel and tangential), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

As previously mentioned, TBS systems include servo patterns written to the recording media. The servo patterns may include magnetic transitions having a chevron pattern which implements two different azimuthal slopes, e.g., as shown in FIG. 6.

Figure 6:
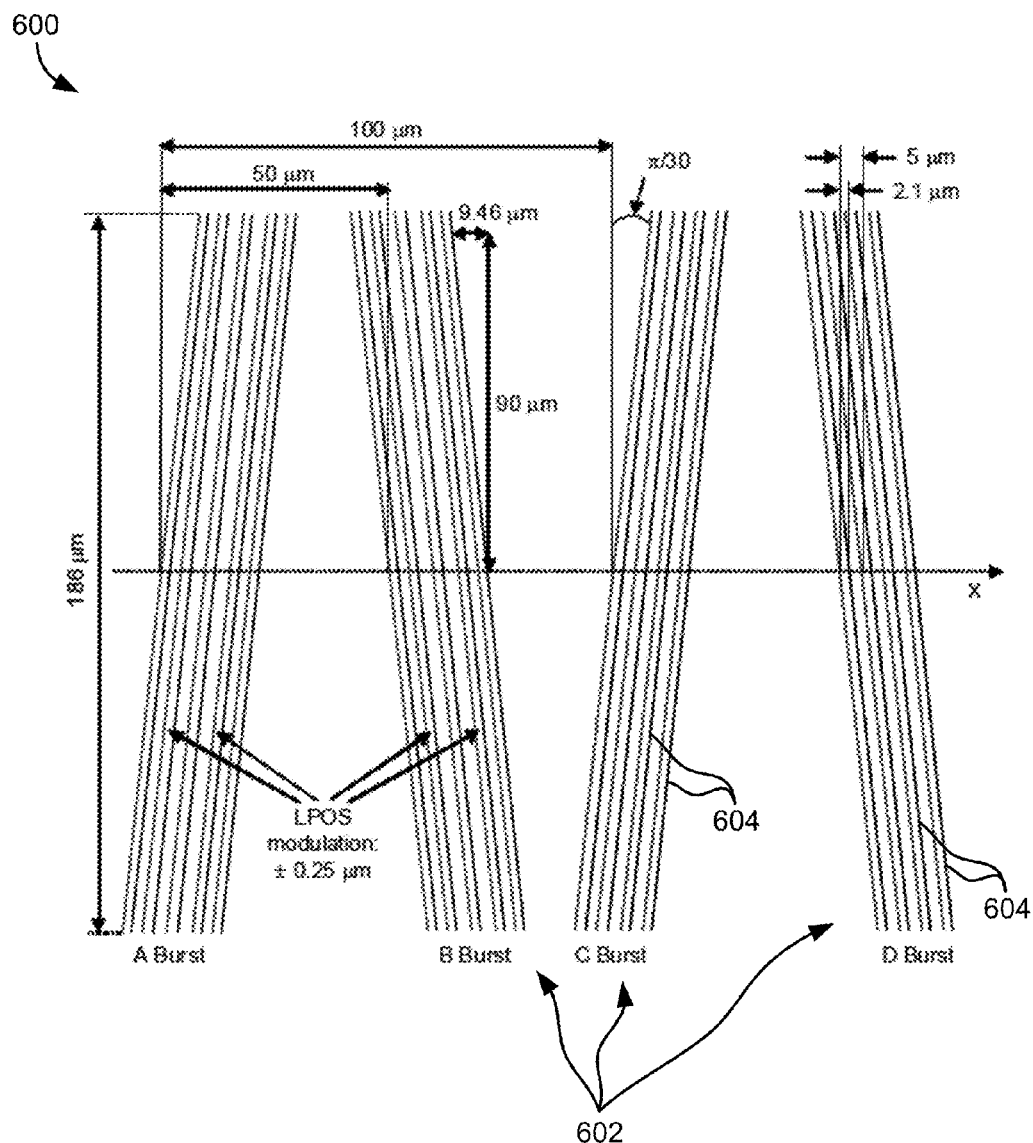
FIG. 6 is a representative view of a servo pattern according to one embodiment.

FIG. 6 depicts a servo pattern 600 of a servo track, in accordance with one embodiment. As an option, the present servo pattern 600 may be implemented in conjunction with features from any other embodiment listed herein, such as those described with reference to the other FIGS. However, such servo pattern 600 and others presented herein may be used in various applications and/or in permutations which may or may not be specifically described in the illustrative embodiments listed herein. Further, the servo pattern 600 presented herein may be used in any desired environment. Thus FIG. 6 (and the other FIGS.) may be deemed to include any possible permutation.

Referring now to FIG. 6, a head position may be derived from the relative timing of pulses, or dibits, generated by reading the servo marks 604 of the servo bursts 602 labeled Bursts A, B, C, and D of the servo pattern 600. The servo pattern 600 may be read using servo readers (e.g., see 212 and 331 of FIGS. 2 and 5 respectively) which may be of any suitable type known in the art. Specifically, the head lateral position can be derived from the relative timing of pulses generated by a servo reader reading the servo pattern.

On a magnetic recording tape having four data bands, the servo patterns are written along five dedicated servo bands that straddle the four data bands. Within each servo band, servo marks 604, organized in bursts 602, extend laterally across each servo band. It should be noted that although the geometry of the servo marks 604 in the servo pattern 600 illustrated in the present embodiment are specified in the linear tape-open (LTO) format, any format of servo patterns may be used depending on the desired embodiment. The complete format for LTO drives of a first generation (LTO-1) was standardized by the European Computer Manufacturers Association (ECMA) in 2001 as ECMA-319. Additional information on LTO technology, in particular on LTO drives of generations 2 to 6 (LTO-2 to LTO-6) can be found on the World Wide Web (www) at ultrium.com.

The signal obtained by reading the servo marks 604 of the servo pattern 600 is used to extract servo-channel parameters such as tape velocity, read head transversal (y)-position information, longitudinal position signal (LPOS) information, etc. According to the exemplary embodiment illustrated in the servo pattern 600 of FIG. 6, which is in no way intended to limit the invention, the transitions on tape have an azimuth angle of about 3 to about 9 degrees. Moreover, each servo mark 604 may be translated by a servo reader into a pulse (e.g., dibit), which exhibits a positive peak and a negative peak. The four servo bursts 602 include, from left-to-right, a sequence of 5-5-4-4 servo marks 604. The arrival times of the dibit peaks corresponding to the servo marks 604 of the servo bursts may also be used to determine the transversal position of the reader. Furthermore, the frequency at which the bursts are detected can be used to determine the velocity of tape. Bits encoded in the second and fourth dibits in the A and B bursts may also be decoded to reconstruct the longitudinal position.

TBS patterns of servo pattern 600 may also be used to encode additional LPOS information without affecting the associated transversal position error signal (PES). LPOS information may be implemented using binary pulse-position modulation (PPM) of dibits corresponding to the second and fourth servo marks 604 in the servo bursts 602, as indicated in FIG. 6, where the encoding of 1 bit of LPOS information per servo frame is illustrated. An LPOS word in LTO format may contain 36 bits, and provides information on a specific longitudinal address. Accordingly, an LPOS word in the LTO format may appear once every 36 servo frames, e.g., every 7.2 mm along the length of the tape, as a frame may be about 200 μm long. Moreover, each LPOS word may encode 36 bit of information, and the LPOS values of two consecutive LPOS words may differ by one.

According to some embodiments, the estimates of the servo reader lateral position, the tape velocity, the LPOS information, etc. may be directly obtained by monitoring the peak arrival times of the dibits of the servo bursts 602. Moreover, in some embodiments, LTO drives may be able to position a magnetic head assembly along the length of a tape to a position corresponding to a given LPOS value with a longitudinal resolution of about 7.2 mm, but may be higher or lower depending on the desired approach. It should also be noted that the dimensions included in FIG. 6 are presented by way of example only and are in no way intended to limit the invention. For example, according to another illustrative embodiment, servo patterns may be characterized as having an azimuth angle of about 12 deg., stripe width of about 1.26 μm, distance between servo stripes of about 3 μm, subframe length of about 76 μm, and servo band width of about 93 μm. The modulation depth may be from about 0.25 μm to about 0.3 μm depending on the embodiment. Moreover, according to some media types, the encoding of more than one bit by binary PPM may be considered, e.g., the encoding of two bits by using four position shift levels.

It follows that over time, different tape media having varied characteristics have been adopted, particularly in terms of the servo readback signal. In particular, a transition from longitudinally-oriented metal particle (MP) media to non-oriented and perpendicularly-oriented BaFe media, characterized by better signal-to-noise ratio characteristics has occurred. Moreover, transition from BaFe media to sputtered media may be envisaged. However, the differences between the various tape media are not limited to SNR performance, but also include other important servo signal characteristics. For example, tape media may implement different temporal and spectral shapes and/or the peak-to-peak distances of the dibit readback signal produced by the magneto-resistive (MR) servo readers.

Figure 7:
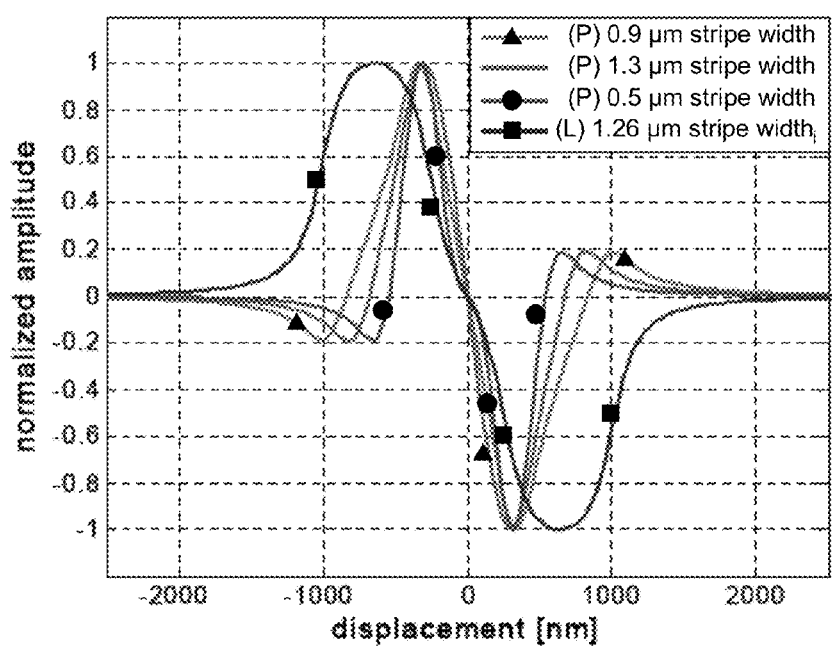
FIG. 7 is a graph showing the dibit readback signals according to various embodiments.

Specifically, looking to the graph 700 of FIG. 7, dibit readback signals produced as a result of reading various types of tape media are shown. It should be noted that the plot associated with the tape media having a stripe width of 1.26 μm corresponds to longitudinal media (L), while the other three plots correspond to perpendicular media (P). The signals show not only that the characteristics of dibit readback signals obtained with longitudinal recording are different than those with perpendicular recording, but also that the dibit readback signals with perpendicular recording having different servo dimensions exhibit different characteristics. Specifically, dibit readback signals obtained with longitudinal recording have different stripe widths than dibit readback signals obtained with perpendicular recording, as represented in the graph 700. Furthermore, the dibit readback signal shape may depend on the media pre-erase method during factory servo formatting; the servo reader geometry, e.g. the reader width, shield-to-shield distance, etc.; the servo pattern parameters, e.g. azimuth angle, stripe width, stripe pitch, etc.; etc.

Reliable detection of the servo patterns is preferably achieved by implementing a synchronous servo channel which employs an interpolator and/or correlator, which ensures that optimum filtering of the servo reader signal for the extraction of timing information is performed not only at constant tape velocity, but also during acceleration and deceleration. A synchronous servo channel thereby enables a desirable processing of a servo signal for the generation of head lateral position estimates, velocity estimates, and LPOS information.

However, the number of samples per unit of length of tape that are provided by the interpolator to the correlator is fixed in conventional products. As mentioned above, a drive preferably satisfies backward compatibility requirements set by the tape industry which typically include the ability to read data written on tape cartridges of up to two generations earlier, and write data on tape cartridges of up to one generation earlier. Yet a problem arises in that interpolation distances which may be optimally chosen for the media characteristics, servo pattern, servo reader geometry, etc. of one tape generation may be suboptimal for the media characteristics, servo pattern, servo reader geometry, etc., of different (e.g., earlier) tape generations and may therefore lead to nonnegligible losses in servo performance.

Furthermore, the correlator acts as a digital filter which provides the function of a matched filter for incoming servo signals. However, the fixed distances between the samples at the output of the interpolator in conventional products severely limits the dispersion that can be efficiently handled by the correlators. Again, different generations of media include varied media characteristics and different dispersion which cannot be effectively processed by conventional products which implement fixed distances between samples at the output of the interpolator.

In sharp contrast, various embodiments described herein introduce methods and/or apparatuses which are able to adjust the sampling interval of the interpolator as will soon become apparent. Moreover, some embodiments described herein are able to alternatively or additionally adjust the correlator coefficients as will be described in further detail below. Thus, some embodiments may include the joint optimization of interpolator sampling intervals and correlator coefficients using different approaches.

Figure 8:
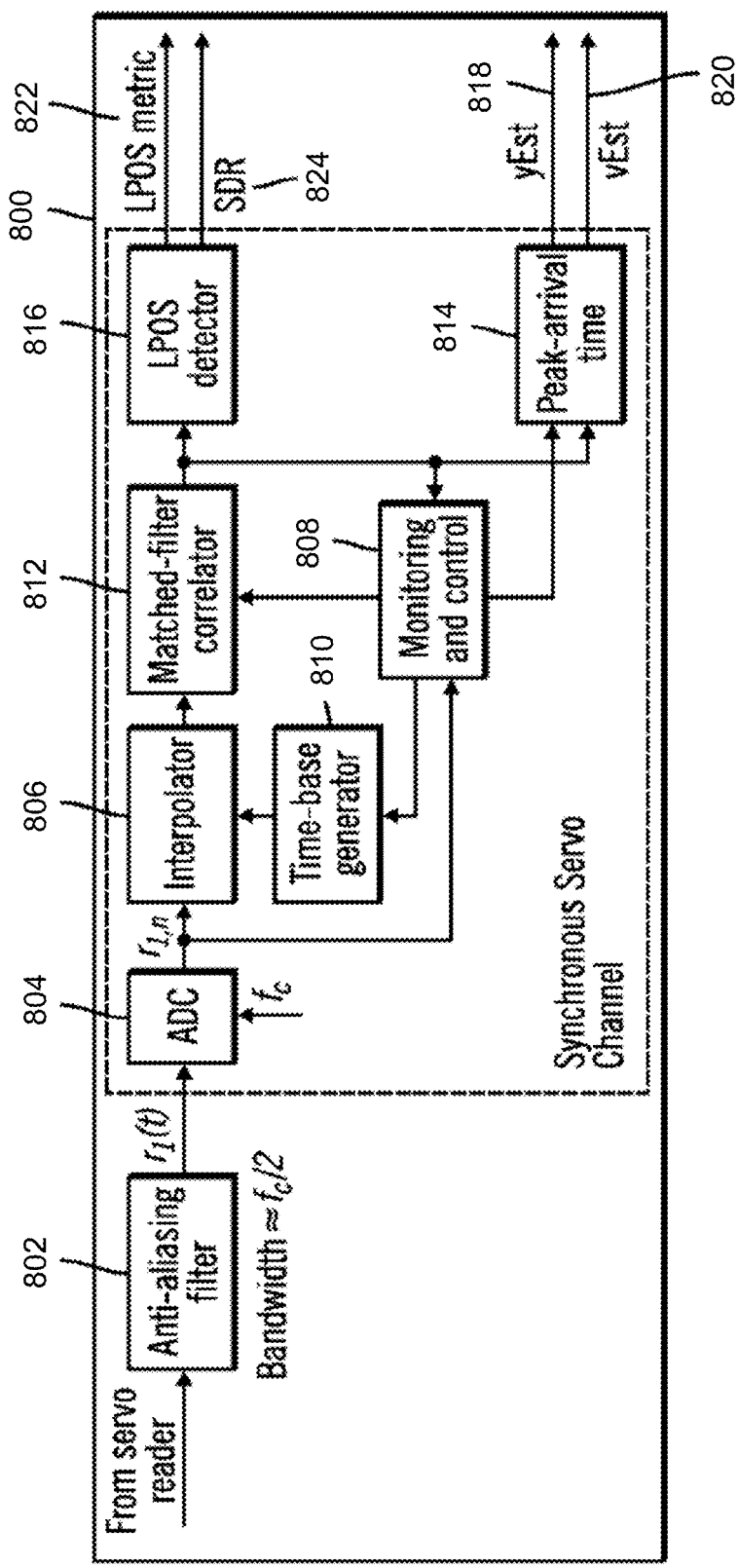
FIG. 8 is a block diagram of a synchronous servo channel according to one embodiment.

Looking at FIG. 8, a block diagram of a synchronous servo channel 800, in accordance with one embodiment. As an option, the present servo channel 800 may be implemented in conjunction with features from any other embodiment listed herein, such as those described with reference to the other FIGS. For example, the servo channel 800 may be implemented in a recording channel of the tape drive 100 of FIG. 1A. However, such servo channel 800 and others presented herein may be used in various applications and/or in permutations which may or may not be specifically described in the illustrative embodiments listed herein. Further, the servo channel 800 presented herein may be used in any desired environment. Thus FIG. 8 (and the other FIGS.) may be deemed to include any possible permutation.

The servo channel 800 may be used to extract essential servo-channel parameters such as tape velocity, read head y-position, LPOS information, etc. As shown, the servo channel 800 includes an anti-aliasing filter 802 which receives input from a servo reader (not shown).

The output of the anti-aliasing filter 802 $r_1(t)$ is routed to an analog-to-digital converter (ADC) 804 which operates at a clock cycle having a frequency $f_c$. It should be noted that the clock cycle frequency $f_c$ is not synchronized with the velocity of the tape as it moves through the head where the servo reader is located. Rather, the servo reader is providing an analog signal which includes servo information which is the information sampled by the ADC 804.

The output of the ADC 804 is directed to a servo channel signal interpolator 806 (also referred to herein an "interpolator") and a monitoring and control component 808. Moreover, the output of the monitoring and control component 808 is routed to a time-base generator 810, to the matched filter correlator 812 and to a peak-arrival time component 814. The output of the time-base generator 810 may include a plurality of signals, e.g., including timing information, that are routed to the interpolator 806. The interpolator 806 additionally receives a sequence of servo signal samples $r_{1,n}$ from the ADC 804 as well as interpolation time instants from the time-base generator 810.

The interpolator 806 outputs a sequence of interpolated servo samples which are directed to the matched filter correlator 812. It is desirable that the interpolator is able to provide an optimal number of samples for each unit of tape. However, the number of samples per unit of length of tape that are provided by the interpolator to the correlator is fixed in conventional products. Again, a problem arises as different tape media having different characteristics are accessed, potentially leading to nonnegligible losses in servo performance. In sharp contrast, various embodiments described herein introduce methods and/or apparatuses which are able to adjust the sampling interval of the interpolator as described in further detail below (e.g., see FIG. 9). Moreover, some embodiments described herein are able to alternatively or additionally adjust the correlator coefficients as will be described in further detail below. Thus, some embodiments may include the joint optimization of interpolator sampling intervals and correlator coefficients using different approaches.

With continued reference to FIG. 8, the correlator 812 receives the interpolated servo signal samples and outputs a sequence of correlation output samples at interpolation time instants into an LPOS detector 816 and peak arrival time computation unit 814. Moreover, the monitoring and control block 808 may provide information to the time-base generator 810, e.g., to determine moments in time at which the interpolator 806 outputs servo signal samples to the correlator 812. Note that the interpolation time difference (the time between two samples output by the interpolator), expressed in microseconds, is defined as the time $T_t$ it takes for the tape to travel over one interpolation interval, $T_{int}$, which is expressed in micrometers. The relationship between the interpolation time $T_t$, and the interpolation interval may be represented by $T_{int} = T_t \times v$, where v denotes the tape velocity. The monitoring and control block 808 provides to the time-base generator 810 information about the tape velocity, given by the velocity estimate vEst 820, for the conversion of points along the tape longitudinal direction, where interpolation samples are to be generated, into time instants, at which interpolation samples are actually generated.

Furthermore, the peak-arrival time computation unit 814 may receive a sequence of correlation output samples from the correlator 812, along with the interpolation time instants, and/or the monitoring and control component 808 output control signals. As shown, the peak arrival time unit 814 computes estimates of tape velocity "vEst" 820 and of y-position (e.g., lateral position) of the servo reader "yEst" 818, preferably at least once per servo frame. The lateral position estimate yEst provides an estimation of the lateral position of the head during track following and exhibits values around a nominal value. The difference between the estimated lateral position of the head and the nominal value may be used to determine the PES, as would be appreciated by one skilled in the art upon reading the present description. Moreover, a standard deviation of the PES may be used to determine desirable interpolator sampling intervals and/or correlator coefficients, as will be described in further detail below.

Tape velocity "vEst" 820 and/or y-position "yEst" 818 are based on peak-arrival times which correspond to the instants at which peaks of the correlator output signal occur. For example, when a sequence of correlation peaks corresponding to the sequence of [5 5 4 4] peaks within a servo frame is detected, the tape velocity and reader y-position estimates are computed. As previously mentioned, the sequence of [5 5 4 4] peaks is a characteristic of the sequence of servo bursts of a servo frame as illustrated in FIG. 6.

Referring still to FIG. 8, the LPOS detector 816 receives the output samples of the correlator 812, and the LPOS detector 816 outputs an LPOS metric 822 as well as a signal-to-noise plus distortion ratio (SDR) estimate 824. Specifically, the output of the correlator 812 is used to determine the arrival time of peaks of the correlator output signal after filtering the interpolated servo signal samples with a filter having an impulse response given by a reference waveform. From this information, the LPOS detector 816 and peak arrival time component 814 are able to extract estimates of: the lateral position 818 of a magnetic head (e.g., see 126 of FIG. 1A), the tape velocity 820, the LPOS 822 encoded in the servo pattern, and/or the SDR 824.

The correlator 812 may use a reference waveform provided by the monitoring and control unit 808 to perform filtering of the interpolated read servo signal. Moreover, the monitoring and control block 808 may provide the correlator coefficients to initialize the reference waveform for correlator 812. In preferred approaches, the reference waveform used by the correlator 812 matches the sampled dibit waveform obtained from the interpolated read servo signal.

Figure 9:
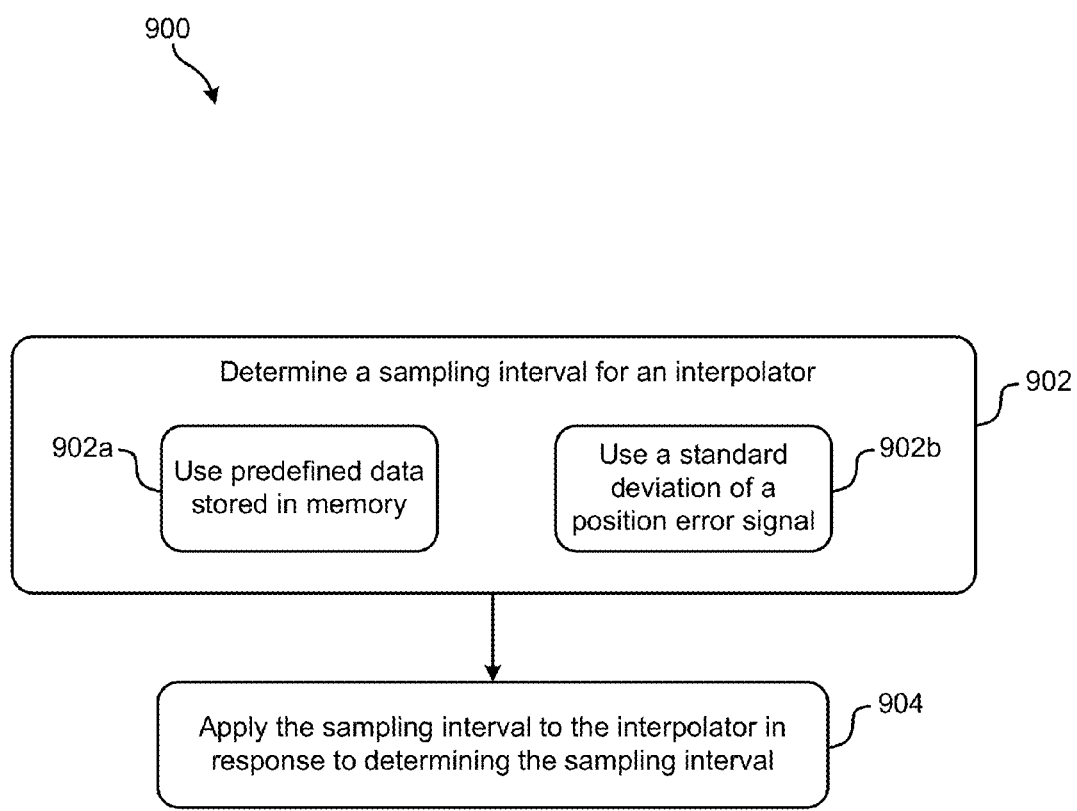
FIG. 9 is a flowchart of a method according to one embodiment.

Now referring to FIG. 9, a flowchart of a method 900 is shown for determining a sampling interval, in accordance with one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

Method 900 of FIG. 9 includes operation 902, where a sampling interval is determined for an interpolator. As mentioned above, it is desirable to determine a sampling interval to apply to the interpolator based on the current status of the tape being accessed. By determining and applying a sampling interval which corresponds to the current status of the tape being accessed, reliable detection of the servo patterns may be achieved by optimally filtering servo reader signals for the extraction of timing information not only at constant tape velocities, but also during tape acceleration and/or deceleration. As a result, desirable processing of servo signals may be achieved for the generation of head lateral position estimates, tape velocity estimates, LPOS information, etc.

Depending on the desired approach, the sampling interval may be determined using different processes which have been represented in FIG. 9 as sub-operations of operation 902. According to one approach, the sampling interval may be determined by using predefined data stored in memory. See sub-operation 902a. The memory may be located in a servo channel (e.g., see 800 of FIG. 8), in a cartridge memory of the tape being accessed, in a lookup table accessible by a controller, etc. For example, the predefined data may include information stored on a lookup table in a tape drive. According to another example, the predefined data may be stored in a cartridge memory corresponding to a magnetic medium (e.g., tape) being accessed. Further still, the predefined data may include information stored on a magnetic medium (e.g., tape) itself which may be accessed when reading data therefrom.

Moreover, the predefined data may include at least one characteristic of a magnetic recording medium product. According to various approaches, the predefined data may include any one or more of media types, magnetic stripe widths, correlator length, tape cartridge generations, dibit characteristics, etc., depending on the desired embodiment. Thus, a desired sampling interval may be accessed and/or calculated for a given tape condition based on the nature of the predefined data stored in memory. For example, in some approaches the desired sampling intervals themselves may be stored in memory for different tape conditions and/or characteristics. However, in other approaches, data (e.g., such as dibit readback characteristics) may be stored in memory, from which the desired sampling interval may be calculated, extracted, interpolated, etc. for a given tape condition and/or characteristic. According to one example, which is in no way intended to limit the invention, one or more sampling intervals may be determined based, at least in part, on a length of a correlator coupled to the interpolator. As the length of the correlator is finite (e.g., typically corresponding to between 12 and 16 coefficients), the sampling interval chosen for interpolation may be obtained as a trade-off between the desire to have a span of the correlator impulse response that is approximately equal to the dispersion of a dibit, and the desire to avoid aliasing effects that would arise when the sampling interval is large compared to the peak-to-peak distance that characterizes a dibit.

Figure 10A:
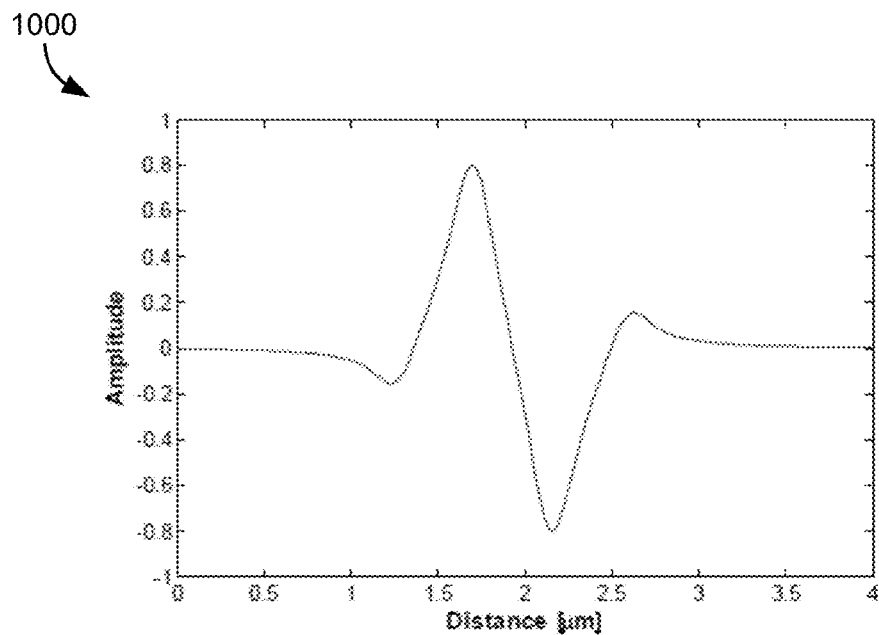
FIGS. 10A-10B are graphs of the dibit characteristics for two different embodiments.
Figure 10B:
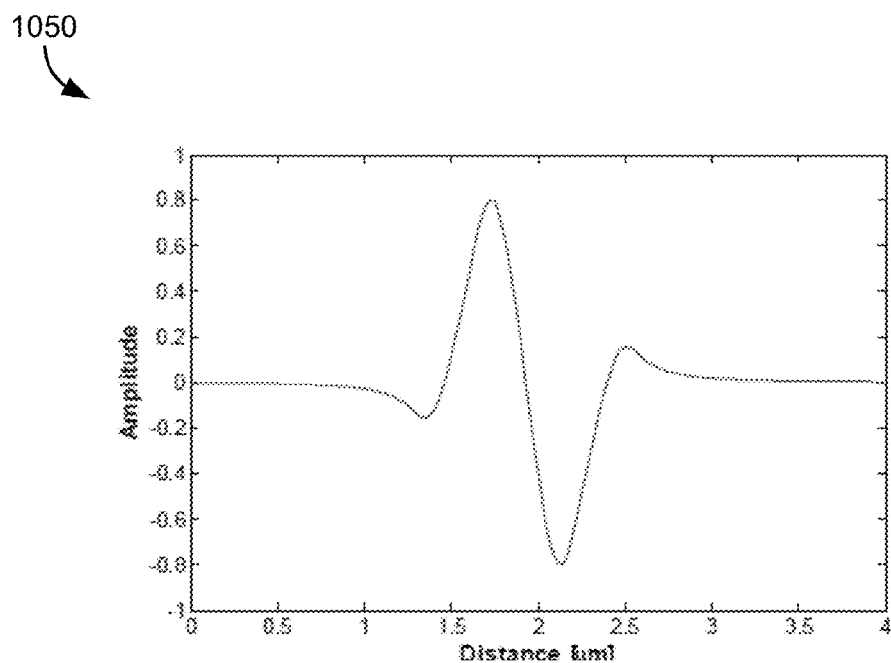

According to another example, FIGS. 10A-10B include graphs 1000, 1050 which illustrate dibit readback characteristics for perpendicularly-oriented BaFe tapes having magnetic stripe widths of 900 nm and 650 nm respectively. These differences in magnetic stripe widths correspond to a different distance experienced between the peaks of the dibits. There also is a difference in the dispersion of the dibit characteristics in the two cases. As mentioned above, the different dibit readback characteristics represented in graphs 1000, 1050 may be stored in memory and accessed to determine a desired sampling interval of an interpolator given the desired embodiment.

However, with continued reference to method 900, the sampling interval may be determined using a standard deviation of a PES according to alternative approaches. See sub-operation 902b. It should be noted that although sub-operations 902a and 902b are illustrated in the present embodiment as being performed in mutually exclusive situations, according to some approaches, both sub-operation 902a and sub-operation 902b may be performed, e.g., when a lookup to memory fails, in situations where high accuracy of the sampling interval is desired, etc. Thus, the mutually exclusive nature of sub-operations 902a and 902b as presented herein is in no way intended to be limiting.

The servo channel performance may be measured in terms of the standard deviation of the PES achieved during closed-loop track-following servo operation. An exemplary iterative process of determining the sampling interval using a standard deviation of a PES is presented below with reference to FIG. 11, but is in no way intended to limit the invention.

Moreover, referring still to FIG. 9, operation 904 includes applying the sampling interval to the interpolator in response to determining the sampling interval. Accordingly, the sampling interval of the interpolator may effectively be programmable by implementing the various embodiments described and/or suggested herein, e.g., depending on the characteristics of the media considered for a given tape drive operation.

As stated above, some embodiments described herein may be able to alternatively or additionally adjust the correlator coefficients. Accordingly, the correlator coefficients of a given embodiment may be determined using any one or more of the operations described in method 9. For example, correlator coefficients may be determined using the predefined data and/or the standard deviation of the position error signal. Moreover, the correlator coefficients may be applied to a correlator in response to determining the correlator coefficients. Thus, some embodiments may include the joint optimization of interpolator sampling intervals and correlator coefficients using different approaches.

Figure 11:
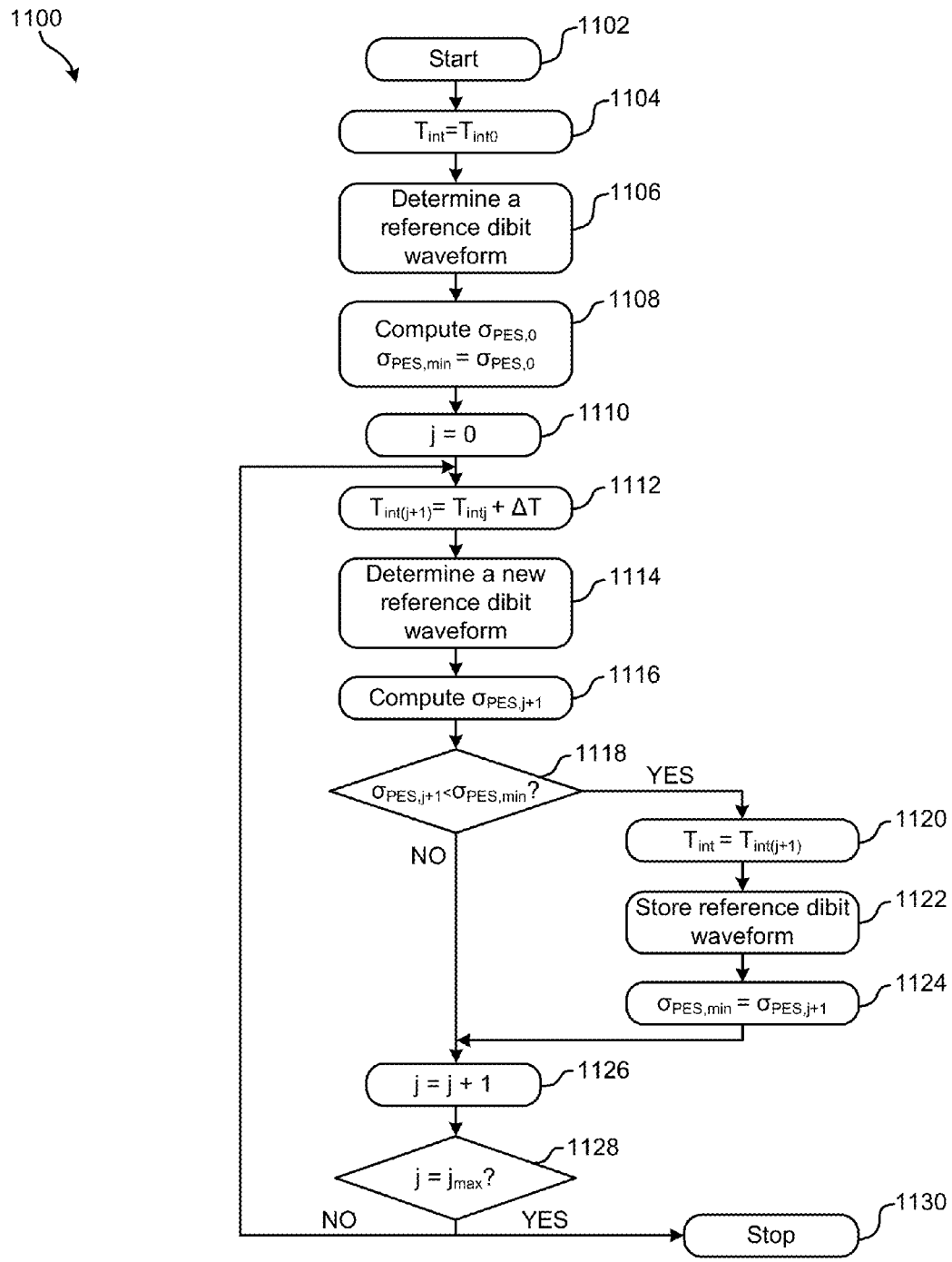
FIG. 11 is a flowchart of a method according to one embodiment.

Now referring to FIG. 11, a flowchart of a method 1100 is shown according to one embodiment. The method 1100 may be performed in accordance with the present invention in any of the environments depicted in FIGS. 1-9, among others, in various embodiments. According to one approach, which is in no way intended to limit the invention, any one or more of the processes included in method 1100 may be performed as an iterative process in relation to operations 902 and 902b described above. More or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

Method 1100 incorporates the standard deviation of the PES when operating the drive, e.g., during closed-loop track following. The PES is indicative of the performance of a drive from a track following point-of-view, and therefore may be used as an accurate metric for determining the desired sampling interval. However, it should be noted that although the present embodiment incorporates the standard deviation of the PES, in alternate embodiments, which are in no way intended to limit the invention, information corresponding to a comparison of SDR vs. SNR may be used to achieve the same or similar results as those described below.

Now looking to FIG. 11, method 1100 includes 1102, where servo operation is initiated. Moreover, operation 1104 includes setting a sampling interval $T_{int}$ to an initial value $T_{int0}$. The initial value of the sampling interval may be predetermined, an arbitrarily chosen value, determined based on the media type being accessed, etc.

Operation 1106 includes determining a reference dibit waveform by averaging a plurality of interpolated dibit waveforms from consecutive bursts of a servo signal. According to an in-use embodiment, a head may be used to collect data from a magnetic tape in order to estimate the reference dibit of the particular interpolation interval and/or estimate the standard deviation of the PES. Typically this data may be collected over a few seconds, but may take longer or shorter depending on the desired embodiment.

Furthermore, an initial (e.g., reference) standard deviation "$\sigma_{PES,0}$" of the PES is computed in operation 1108 and preferably stored in memory (e.g., a lookup table) as a minimum standard deviation value "$\sigma_{PES,min}$". According to preferred approaches, the drive is run (e.g., operated) in a closed-loop track following procedure while the standard deviation of the PES is measured, but is in no way limited thereto. As previously described, the PES of a given embodiment may be derived from the difference between the estimated and the nominal values of the lateral position of a head during track following.

Furthermore, operation 1110 includes setting an iteration counter "j" equal to zero, while operation 1112 includes increasing the sampling interval by an increment $\Delta T$. Depending on the desired embodiment, $\Delta T$ may be predefined, determined by a user, calculated in real time, etc. Accordingly the value of the sampling interval $T_{int}$ incrementally increases across a range of interpolation intervals. Thus, the interpolation time that, for a given velocity of tape is proportional to the interpolation interval, increases incrementally as well. This is in stark contrast to conventional shortcomings described above in which the sampling interval cannot change, i.e., is simply fixed.

Referring again to the embodiment of method 1100, after increasing the sampling interval, operation 1114 includes determining a new (e.g., updated) reference dibit waveform by averaging a plurality of interpolated dibit waveforms from consecutive bursts. According to one approach, operation 1114 may be performed using similar and/or the same steps as used during the determination performed in operation 1106, but using a different waveform for the correlator. Moreover, operation 1116 includes computing an updated standard deviation of the PES.

Decision 1118 compares the value of the updated standard deviation with the minimum standard deviation value $\sigma_{PES,min}$ currently stored in memory. As the procedure illustrated in FIG. 11 is iterated, the minimum achieved standard deviation is preferably stored, and if a lower standard deviation is achieved in subsequent iterations, the minimum standard deviation may be updated along with the corresponding sampling interval which may be used during normal drive operation if yet a lower standard deviation is not achieved. It follows that for the first iteration of the processes of method 1100, the minimum standard deviation value $\sigma_{PES,min}$ is equal to the standard deviation computed in operation 1108. However, in subsequent iterations, the minimum standard deviation value $\sigma_{PES,min}$ may be replaced with lower values.

In response to determining in decision 1118 that the value of the updated standard deviation is greater than the minimum standard deviation value $\sigma_{PES,min}$, method 1100 proceeds directly to operation 1126 described below. Alternatively, in response to determining that the value of the updated standard deviation is less than the minimum standard deviation value $\sigma_{PES,min}$, method 1100 proceeds to operation 1120 where the sampling interval $T_{int}$ is set equal to the sampling interval of the current iteration $T_{int(j+1)}$. Moreover, operation 1122 includes storing the reference dibit waveform determined in operation 1114 in memory, while operation 1124 includes updating the minimum standard deviation value $\sigma_{PES,min}$ with the standard deviation value computed in 1116. Again, operations 1120, 1122, 1124 are performed in response to determining that the value of the standard deviation computed in operation 1116 is less than the minimum standard deviation value $\sigma_{PES,min}$. Thus, the standard deviation computed in operation 1116 becomes the minimum standard deviation value $\sigma_{PES,min}$. According to some approaches, the minimum standard deviation value $\sigma_{PES,min}$ may simply be overwritten, but in other approaches, previous minimum standard deviation values may be preserved in memory, e.g., for recovery purposes.

Referring still to method 1100, operation 1126 includes incrementing the iteration counter. Moreover, decision 1128 determines whether the incremented iteration counter has reached a maximum value $j_{max}$, e.g., a threshold. Method 1100 is ended in response to determining that the incremented iteration counter has reached its maximum value. See operation 1130. However, method 1100 is redirected to operation 1112 described above in response to determining that the incremented iteration counter has not reached a maximum value. The maximum value $j_{max}$ may be predefined, selected to cover a given range, etc., depending on the desired embodiment. For example, a specific choice of $j_{max}$ results in a coverage range of the interpolation interval $T_{int}$ from a minimum value of $T_{int0}$ to a maximum value of $T_{int0}+\Delta T^*j_{max}$.

It follows that the various processes of method 1100 are able to keep track of the achieved values of the standard deviation of the PES until a minimum standard deviation value $\sigma_{PES,min}$ is determined. As a result, the sampling interval corresponding to the minimum standard deviation value $\sigma_{PES,min}$ determined using the processes of method 1100 may then be selected as the optimum value for the sampling interval and implemented with an associated interpolator. Moreover, the processes of method 1100 may be used to improve correlator coefficients which may be used in a servo channel, e.g., see 800 of FIG. 8.

Upon determining a desired sampling interval and/or correlator coefficients according to any of the approaches described and/or suggested herein, the sampling interval and/or correlator coefficients may be retained for different amounts of time depending on the desired embodiment. For example, upon determining a desired sampling interval and/or correlator coefficients, the selected settings may be used for the remainder of the tape cartridge, for a predetermined amount of time, etc., e.g., depending on the desired embodiments. For example, any one or more of the aforementioned steps of the flowchart may be performed for a given cartridge when loaded into a drive and the resulting settings may be stored in memory and implemented for the remainder of time the cartridge is in the drive. According to another example, any one or more of the aforementioned processes may be repeated during the use of a given tape cartridge. In some approaches, it may be assumed that the optimal dibit reference would not change when in the cartridge, e.g., from the beginning to end of tape, and/or over the lifetime of the tape itself. Again, the exact frequency of operation is up to the choice of an operator. According to a preferred approach, method 1100 may be performed one time for each tape cartridge, but may be performed more or less frequently.

In yet another example, any one or more of the processes described in method 1100 may be applied during media qualification which may be performed before a product (e.g., a magnetic tape) is shipped. Accordingly, the determined settings may be stored in a memory corresponding to the product (e.g., a cartridge memory) at the time of manufacture. As a result, a drive may access a desired interpolation interval and/or reference dibit waveform to use during operation from the cartridge memory. However, according to other approaches, the aforementioned method 1100 may be applied to a given cartridge when it is loaded into the drive for a first time. Again the interpolation interval and/or reference dibit waveforms may be stored in a cartridge memory and may be used in future applications, e.g., each time the cartridge is loaded into a drive. Ultimately there is a range of situations and/or frequencies at which a recalibration operation may be performed, e.g., such as the one illustrated in FIG. 11.

Figure 12A:
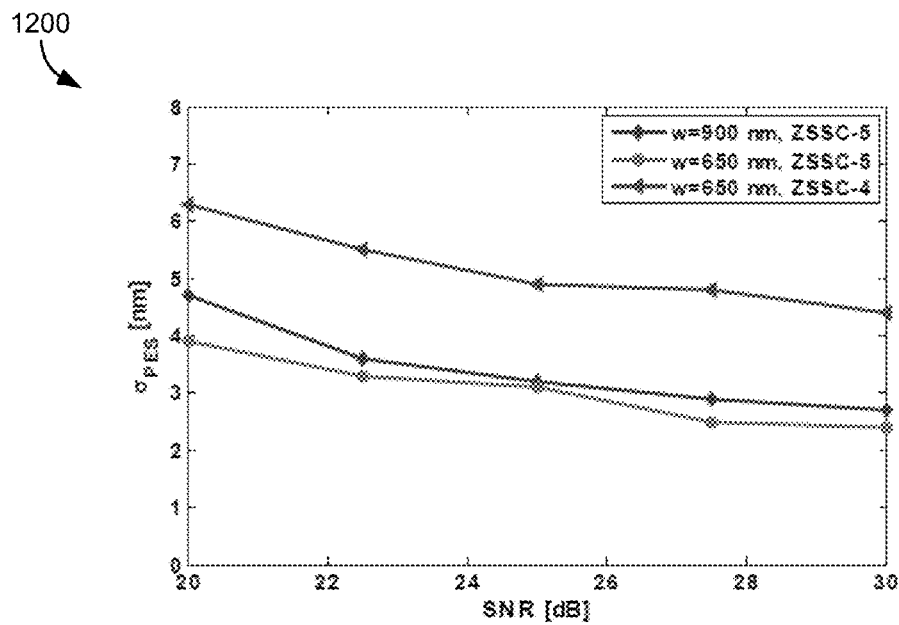
FIG. 12A is a graph of SNR vs. the standard deviation of a position error signal according to various embodiments.
Figure 12B:
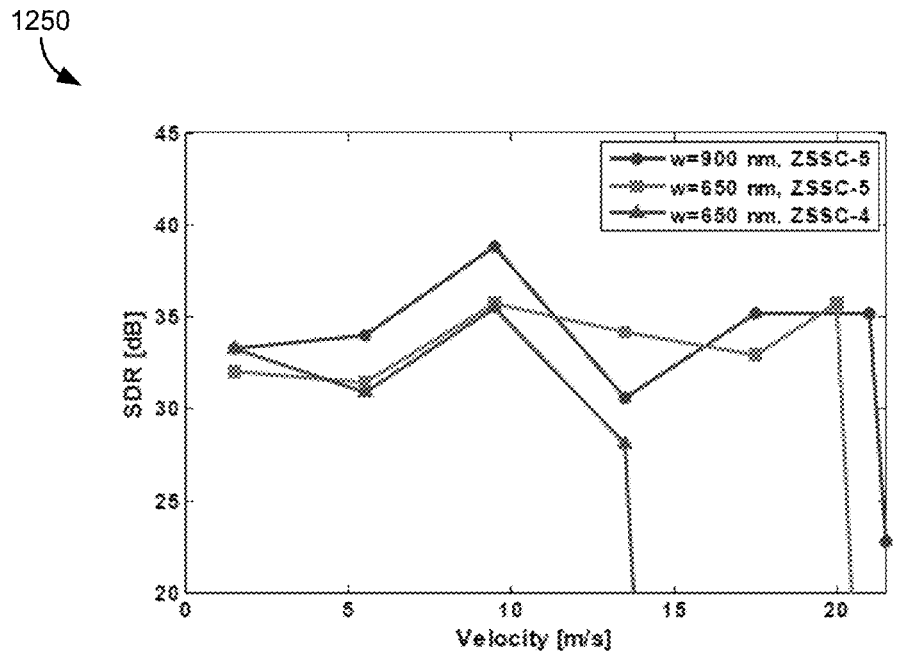
FIG. 12B is a graph of the signal-to-noise plus distortion ratio vs. tape velocity according to various embodiments.

Looking now to FIGS. 12A-12B, graphs 1200, 1250 illustrate the improvements which may be achieved by implementing the various embodiments described herein. Specifically, graph 1200 of FIG. 12A shows the standard deviation of the PES as a function of SNR for different types of tape having different characteristics. The different values of the standard deviation correspond to different interpolation sampling intervals which are 180 nm for the ZSSC-4 servo channel having 12 coefficients in a corresponding correlator, and 120 nm for the ZSSC-5 servo channel having 16 coefficients in a corresponding correlator. Also, the two ZSSC-5 results correspond to different servo stripe widths of 900 nm and 650 nm as indicated. The plots of graph 1200 illustrate that although the two ZSSC-5 results have the same interpolation sampling intervals, the difference in the servo stripe widths cause the sampling interval of 120 nm to have a different result on each type of tape. Furthermore, although the ZSSC-4 result and the ZSSC-5 result having a stripe width of 650 nm have equal stripe widths, the different sampling intervals result in a drastic difference in performance. It follows that by selectively adjusting the interpolation sampling intervals for various embodiments, the resulting characteristics may be desirably improved.

Referring now to graph 1250, FIG. 12B shows the SDR value for LPOS detection as a function of tape velocity which spans from about 1 m/s to about 20 m/s for different types of tape. As seen in graph 1200, the plots of graph 1250 illustrate that different sampling intervals have varied effects on different types of tape depending on the tape characteristics. Specifically, by implementing a sampling interval of 120 nm to the ZSSC-5 tapes, the highest supported velocity of tape is desirably increased from about 14 m/s to a velocity greater than 20 m/s.

It follows that the various embodiments described herein present different ways of determining and/or implementing desirable interpolator sampling intervals and/or correlator coefficients.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
   determining a sampling interval for an interpolator using at least one of:
      predefined data stored in memory, and
      a standard deviation of a position error signal; and
   applying the sampling interval to the interpolator in response to determining the sampling interval.

2. The method as recited in claim 1, wherein the method is performed by a tape drive.

3. The method as recited in claim 1, comprising:
   determining correlator coefficients using the at least one of:
      the predefined data, and
      the standard deviation of the position error signal; and
   applying the correlator coefficients to a correlator.

4. The method as recited in claim 1, wherein the sampling interval is determined based in part on a length of a correlator coupled to the interpolator.

5. The method as recited in claim 1, wherein the sampling interval is determined using the predefined data.

6. The method as recited in claim 5, wherein the predefined data includes at least one characteristic of a magnetic recording medium product.

7. The method as recited in claim 5, wherein the predefined data includes at least one of: media type, magnetic stripe width, and tape cartridge generation.

8. The method as recited in claim 1, wherein the sampling interval is determined using the standard deviation of the position error signal.

9. The method as recited in claim 8, wherein the sampling interval is determined as a result of an iterative process comprising:
   computing a reference standard deviation of the position error signal;
   incrementing a sampling interval;
   computing an updated standard deviation of the position error signal;
   comparing the reference standard deviation and the updated standard deviation; and
   storing the updated standard deviation as the reference standard deviation in response to the reference standard deviation being greater than the updated standard deviation.

10. An apparatus, comprising:
    an interpolator; and
    a controller, the controller being configured to:
       determine a sampling interval for the interpolator using at least one of:
          predefined data stored in memory, and
          a standard deviation of a position error signal; and
       apply the sampling interval to the interpolator in response to determining the sampling interval.

11. The apparatus as recited in claim 10, wherein the controller is configured to:
    determine correlator coefficients using the at least one of:
       the predefined data, and
       the standard deviation of the position error signal; and
    applying the correlator coefficients to a correlator.

12. The apparatus as recited in claim 10, wherein the sampling interval is determined based in part on a length of a correlator coupled to the interpolator.

13. The apparatus as recited in claim 10, wherein the sampling interval is determined using the predefined data.

14. The apparatus as recited in claim 13, wherein the predefined data includes at least one characteristic of a magnetic recording medium product.

15. The apparatus as recited in claim 13, wherein the predefined data includes at least one of: media type, magnetic stripe width, and tape cartridge generation.

16. The apparatus as recited in claim 10, wherein the sampling interval is determined using the standard deviation of the position error signal.

17. The apparatus as recited in claim 16, wherein the sampling interval is determined as a result of an iterative process comprising:
    computing a reference standard deviation of the position error signal;
    incrementing a sampling interval;
    computing an updated standard deviation of the position error signal;
    comparing the reference standard deviation and the updated standard deviation; and
    storing the updated standard deviation as the reference standard deviation in response to the reference standard deviation being greater than the updated standard deviation.

18. The apparatus as recited in claim 10, further comprising:
    a drive mechanism for passing a magnetic medium over a magnetic head; and
    a controller electrically coupled to the magnetic head.

19. A computer program product comprising a computer readable storage medium having program instructions embodied therewith, the program instructions readable and/or executable by a controller to cause the controller to:
    determine, by the controller, a sampling interval for an interpolator using at least one of:
       predefined data stored in memory, and
       a standard deviation of a position error signal; and apply, by the controller, the sampling interval to the interpolator in response to determining the sampling interval.

20. The computer program product of claim 19, wherein the program instructions are readable and/or executable by the controller to cause the controller to:
   determine correlator coefficients using the at least one of:
      the predefined data, and
      the standard deviation of the position error signal; and
   apply the correlator coefficients to a correlator.

* * * * *